US009329072B2

(12) United States Patent
Sai

(10) Patent No.: US 9,329,072 B2
(45) Date of Patent: May 3, 2016

(54) RECEIVER WITH PROGRAMMABLE GAIN FOR UWB RADAR

(71) Applicant: HONEYWELL INTERNATIONAL INC., Morristown, NJ (US)

(72) Inventor: Bin Sai, Zuid Holland (NL)

(73) Assignee: Honeywell International Inc., Morristown, NJ (US)

( * ) Notice: Subject to any disclaimer, the term of this patent is extended or adjusted under 35 U.S.C. 154(b) by 363 days.

(21) Appl. No.: 14/099,071

(22) Filed: Dec. 6, 2013

(65) Prior Publication Data

US 2015/0160065 A1    Jun. 11, 2015

(51) Int. Cl.
| | |
|---|---|
| *G01S 7/529* | (2006.01) |
| *G01F 23/284* | (2006.01) |
| *G01S 13/88* | (2006.01) |
| *G01S 7/34* | (2006.01) |
| *G01S 13/02* | (2006.01) |
| *G01S 7/292* | (2006.01) |
| *G01S 7/52* | (2006.01) |

(52) U.S. Cl.
CPC ............. *G01F 23/284* (2013.01); *G01S 7/2921* (2013.01); *G01S 7/34* (2013.01); *G01S 13/0209* (2013.01); *G01S 7/529* (2013.01); *G01S 7/52033* (2013.01); *G01S 13/88* (2013.01)

(58) Field of Classification Search
CPC ....... G01S 7/34; G01S 7/489; G01S 7/52033; G01S 7/529; G01S 7/5354; G01S 13/88; G01F 23/284; G01F 23/2845
USPC .............................................. 342/91, 92, 124
See application file for complete search history.

(56) References Cited

U.S. PATENT DOCUMENTS

| | | | | | |
|---|---|---|---|---|---|
| 4,194,200 | A | * | 3/1980 | Goldie | H03G 11/025 333/13 |
| 5,901,172 | A | * | 5/1999 | Fontana | G01S 7/292 329/311 |
| 6,191,725 | B1 | * | 2/2001 | Lavoie | G01S 7/34 342/195 |
| 6,781,540 | B1 | * | 8/2004 | MacKey | G01S 13/90 342/188 |
| 7,088,794 | B2 | * | 8/2006 | Nichols | H03G 3/3052 341/139 |
| 7,541,972 | B1 | * | 6/2009 | Dougherty | G01S 7/34 342/175 |
| 8,098,193 | B2 | * | 1/2012 | Sai | G01S 13/0209 342/102 |
| 8,334,802 | B2 | * | 12/2012 | Ogawa | G01S 7/023 342/118 |
| 2005/0024259 | A1 | * | 2/2005 | Berry | G01F 23/284 342/124 |
| 2008/0136704 | A1 | * | 6/2008 | Chan | G01S 7/282 342/201 |
| 2009/0033543 | A1 | * | 2/2009 | Nilsson | G01F 23/284 342/124 |
| 2010/0109963 | A1 | * | 5/2010 | Kienzle | G01F 23/284 343/786 |
| 2010/0201563 | A1 | * | 8/2010 | Flasza | G01F 23/284 342/124 |
| 2010/0223019 | A1 | * | 9/2010 | Griessbaum | G01F 23/2962 702/75 |
| 2010/0265121 | A1 | * | 10/2010 | Bandhauer | G01S 7/2923 342/135 |
| 2011/0102243 | A1 | * | 5/2011 | Sai | G01S 13/0209 342/124 |
| 2011/0177789 | A1 | * | 7/2011 | Cheng | H03F 1/223 455/73 |
| 2012/0146852 | A1 | | 6/2012 | Park et al. | |
| 2013/0076559 | A1 | * | 3/2013 | Edvardsson | G01S 13/36 342/124 |
| 2013/0250460 | A1 | * | 9/2013 | Grozinger | G01F 15/06 361/54 |
| 2014/0104098 | A1 | * | 4/2014 | Linden | G01F 23/284 342/124 |
| 2015/0338261 | A1 | * | 11/2015 | Mueller | G01S 7/032 342/124 |

FOREIGN PATENT DOCUMENTS

WO        2005013503        2/2005

* cited by examiner

*Primary Examiner* — Peter Bythrow
(74) *Attorney, Agent, or Firm* — Jetter & Associates, P.A.

(57) ABSTRACT

A receiver for an ultra wideband (UWB) pulse radar system includes a programmable gain network (PGN) block coupled to process a received UWB radar signal. The programmable PGN block includes programmable attenuator having an output coupled to an input node of a UWB low noise amplifier (LNA), and a fast acting power limiter is between the input node and a system ground and/or a power supply node for the radar system. A sampling unit is coupled between an output of the LNA and a processor. The processor implements an attenuation algorithm, wherein the processor is coupled to the programmable attenuator, and provides attenuation control signals to dynamically control a gain or attenuation of the programmable attenuator, such as based on a distance from a transmitting antenna to the product material.

19 Claims, 2 Drawing Sheets

RECEIVER WITH PROGRAMMABLE GAIN FOR UWB RADAR

FIELD

Disclosed embodiments relate to systems and methods for determining the level of a product in a storage tank by using ultra wideband (UWB) radar signals emitted to the product surface and analyzing radar signals reflected from the product surface.

BACKGROUND

It is standard practice to use large metal storage tanks for storing a variety of liquids, such as beverage and petroleum products. Conventional large storage tanks are usually made from non-stainless steel plates, and in the case of petroleum products the storage tanks are generally made from ¼ inch (0.63 cm) to ½ inch (1.27 cm) thick steel plates welded together. The dimensions of conventional large storage tanks usually range in the hundreds of feet (100 feet=30.5 meters) in height and hundreds of feet in diameter.

Non-contact electromagnetic detection and sensing may be used to determine the presence or signatures (object classification or shape) of objects, or liquid levels, or the distance to the surface of materials, when other sensing methods have difficulty in providing reliable and/or accurate information. For example, in the oil and gas industry, inaccurate or unreliable tank level measurements can incur a significant loss of profitability/revenue in tank level gauging applications. An error of 1 millimeter (mm) of the level measurement of a material in bulk storage tanks (40-80 meters in diameter) can correspond to volumetric error of several cubic meters. In the case of oil, since the crude oil price is generally at least $100 per barrel (1 barrel=42 US gallons; 159 liters), the 1-mm error can result in thousands of dollars loss for one or more parties involved in trading and oil transfer.

RAdio Detection And Ranging (Radar) has been used as a type of non-contact product level gauge for several decades. The radar system includes a transmitter coupled to a radar antenna which is positioned above the product (e.g., a liquid or solid) for emitting radar signals to the product and a receiver coupled to the antenna (or to another antenna) for receiving radar signals reflected from the product surface, as well as a signal processor for determining the product level on the basis of the emitted radar signals and the reflected radar signals. According to this method, the antenna driven by transmit circuitry emits a radar signal which strikes an object or surface, for example a liquid surface. The object or surface reflects part of the emitted radar signal/wave back in the direction of the antenna, which receives and is coupled to receive circuitry that processes the reflected radar signal/wave.

Pulse radars as a non-destructive/non-contact sensor for liquid level measurements in a storage tank are widely used, because they are relatively inexpensive and simple to install. One type of pulse radar system is Ultra-WideBand (UWB) radar. UWB radar systems transmit signals across a much wider frequency range as compared to conventional narrowband pulse radar systems. The transmitted UWB signal is significant for its very light power spectrum, which is typically lower than the allowed unintentional radiated emissions for electronics. The most common technique for generating a UWB signal is to transmit pulses with very short pulse durations (e.g., ≤1 ns). The UWB pulse covers a very large frequency spectrum, and the frequency spectrum becomes larger as the pulse becomes narrower.

However, limited dynamic range, measuring distance and/or accuracy are drawbacks of pulsed radar including UWB radar in comparison with more complex signal-based radar including frequency-modulated continuous-wave (FMCW; which uses a continuous (linear) frequency sweep versus time) and stepped-frequency continuous-wave (SFCW; or frequency hopping) radar which are more expensive and complex. For UWB radar, the ultra short pulse width enables measurement accuracy, but results in shortening of the measuring distance due attenuation of the low pulse power.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize when Ultra-WideBand (UWB) pulse radar is used to measure a nearby target product material in a container, the effect of mutual (cross) coupling between the transmitter and receiver can become stronger than the product (e.g., liquid) reflection or scattering signal (the intended target signal) from the product interface. As defined herein, UWB refers to a bandwidth of at least 0.5 Giga Hertz (GHz) or fractional bandwidth of at least 25% of the center frequency (which is based on the U.S. Defense Advanced Research Projects Agency's (DARPA's) UWB definition), while UWB signals range in the frequency spectrum can be from 100 MHz to 300 GHz.

Disclosed embodiments recognize for UWB radar systems since using a fast switch is generally not possible to achieve sub-nano second switching time at low cost, to reduce cross coupling of the transmitted UWB signal into the receiver circuitry, one can either reduce the transmitted UWB signal amplitude, or reduce or remove amplification of received signal. Either way, the signal to noise ratio (SNR) of the received radar signal will be reduced, and as a consequence the measuring range and level accuracy for measuring the product level will be degraded.

Disclosed embodiments solve this problem by providing a receiver for a UWB pulse radar system including a programmable gain network (PGN) block coupled to process received radar signals reflected or scattered from a surface of a product in a container or tank before the processor (e.g., digital signal processor (DSP) or microcontroller unit (MCU)). The PGN block includes a programmable attenuator in series with an input node of a UWB low noise amplifier (LNA), and a fast acting power limiter is provided between the input node of the LNA and a ground node for the radar system, with an option for another power limiter between the input node of the LNA and the positive supply node for the radar system. As used herein a "LNA" refers to a special type of electronic amplifier used in communication systems which amplifies very weak signals captured by an antenna. When using a LNA, circuitry is configured so that noise figure is reduced by the gain by the amplifier while the noise of the amplifier is injected directly into the received signal.

A sampling unit including an external sample and hold (S&H) circuit having an input for receiving externally applied trigger signals coupled an analog-to-digital converter (ADC) is positioned between an output of the UWB LNA and the processor. The processor implements an attenuation algorithm, and is coupled to the programmable attenuator to provide attenuation level control signals that dynamically control the attenuation level of the programmable attenuator.

The attenuation control signals from the processor to the programmable attenuator are programmed to cause the PGN block to operate at a low gain or at an attenuation level when the received radar signals are at or above a relatively high signal level (e.g., the cross coupling signals), and at a higher gain level when the received radar signals (e.g., target signals from the product interface) are below the relatively high signal level. Disclosed UWB radar systems having PGNs thus enable using short UWB pulses to measure longer distances at higher accuracy at the same time as compared to conventional fixed receiver gain arrangements.

DETAILED DESCRIPTION

Figure 1:
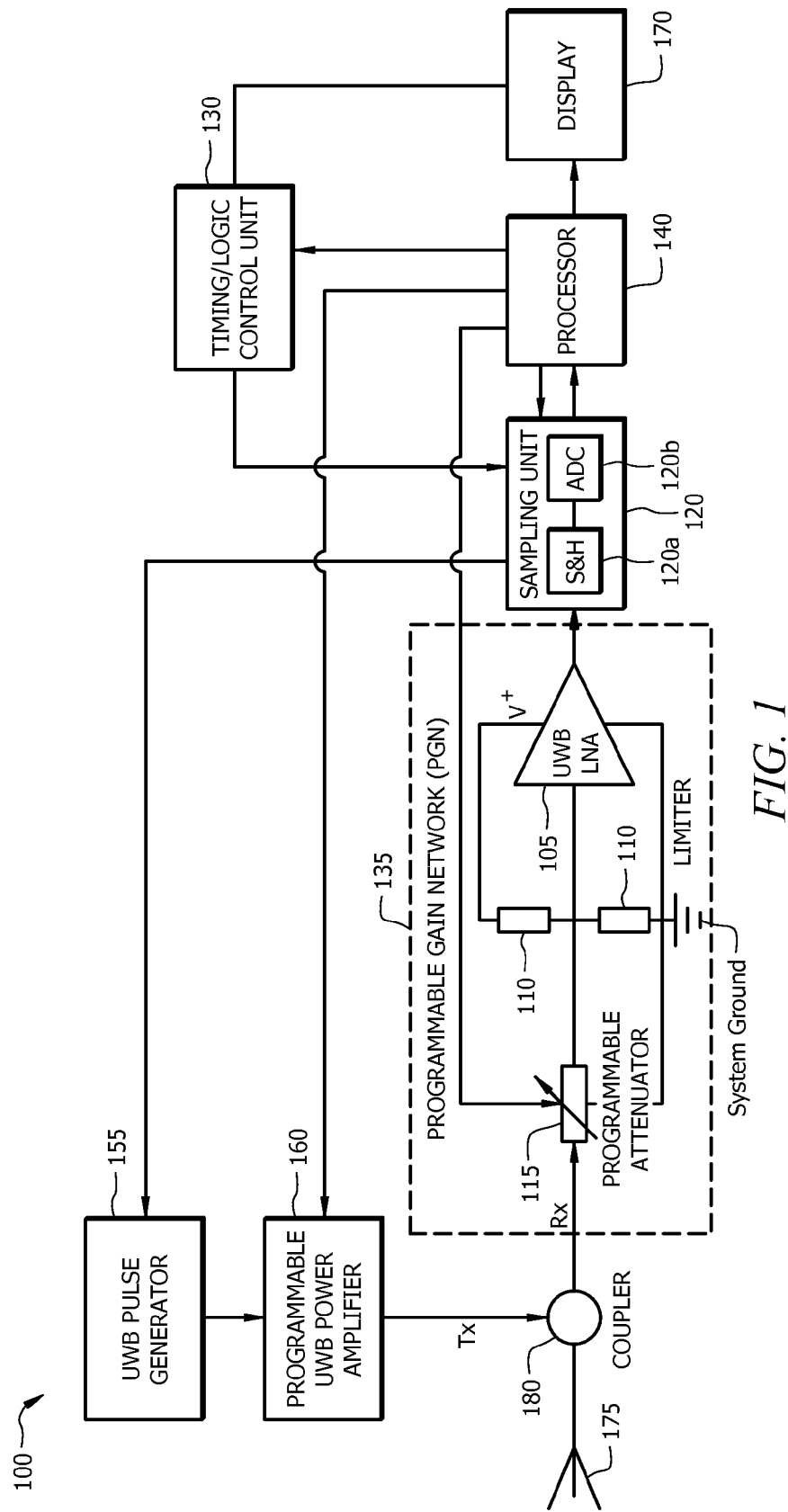
FIG. 1 is a block diagram of an example UWB radar system comprising a receiver including a disclosed PGN block, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a block diagram of an example UWB radar system 100 comprising a receiver including a disclosed PGN block 135, according to an example embodiment. System 100 provides time domain radar sensing and measurements for applications including, but not limited to, distance, product level, and signature determination. UWB radar system 100 also includes a transmitter (Tx), where the Tx shown in FIG. 1 includes optional programmable transmit power control implemented by including a programmable UWB power amplifier (PA) 160, which has its gain controlled by the processor 140.

The Tx circuitry includes a UWB pulse generator 155. UWB pulse generator 155 can use various devices to generate ultra-short pulse waveforms, including but not limited to a step-recovery diode, a tunnel diode, a bipolar transistor, a CMOS transistor, or a Monolithic Microwave Integrated Circuit (MMIC) switch. The triggering for the UWB pulse generator 155 is shown provided by the timing/logic control unit 130 in FIG. 1, where the timing for sample and hold (S&H) 120a and the ADC 120b of the sampling unit 120 are controlled by timing signals from timing/logic control unit 130, and where the timing/logic control unit 130 is coupled to the processor 140. The processor 140 can implement the timing/logic control unit 130 as an algorithm based on a stored algorithm, or the timing/logic control unit 130 can be implemented as shown in FIG. 1 as a separate hardware-based device. Although not shown, the sampling unit 120 can also include a buffer amplifier and a gain/offset control adjust between the S&H 120a and ADC 120b.

The processor 140 is shown in FIG. 1 coupled to an input of the programmable UWB PA160, such as for implementing software defined radio (SDR) to control the power of the transmitted UWB pulse. A SDR scheme including a digital signal processing (DSP)/complex programmable logic device (CPLD) control algorithm, such as implemented by the processor 140 shown in FIG. 1, can be optionally used in the Tx to control the power applied by the programmable UWB PA160 to the transmitted UWB pulse including dynamically adjusting the pulse amplitude (and thus the power) of the transmitted UWB pulse.

Higher programmable UWB PA160 power may be applied to generate high power UWB pulses when the distance to the product material in the storage tank is relatively high (e.g., 100 m). For example, the programmable UWB PA160 can be set to Tx at the highest allowable power level when sensing the target at the farthest distance from the antenna 175. Relatively low power for the programmable UWB PA160 may be used to generate lower power UWB pulses when the distance to the product material is relatively low (e.g., 30 m to 50 m). For example, when the allowable Tx power is less than the maximum, or the target is closer to the antenna 175, the power of UWB PA160 can be set to lower value (e.g., 20 dB lower) so that saturation of the UWB LNA 105 becomes unlikely.

Figure 2:
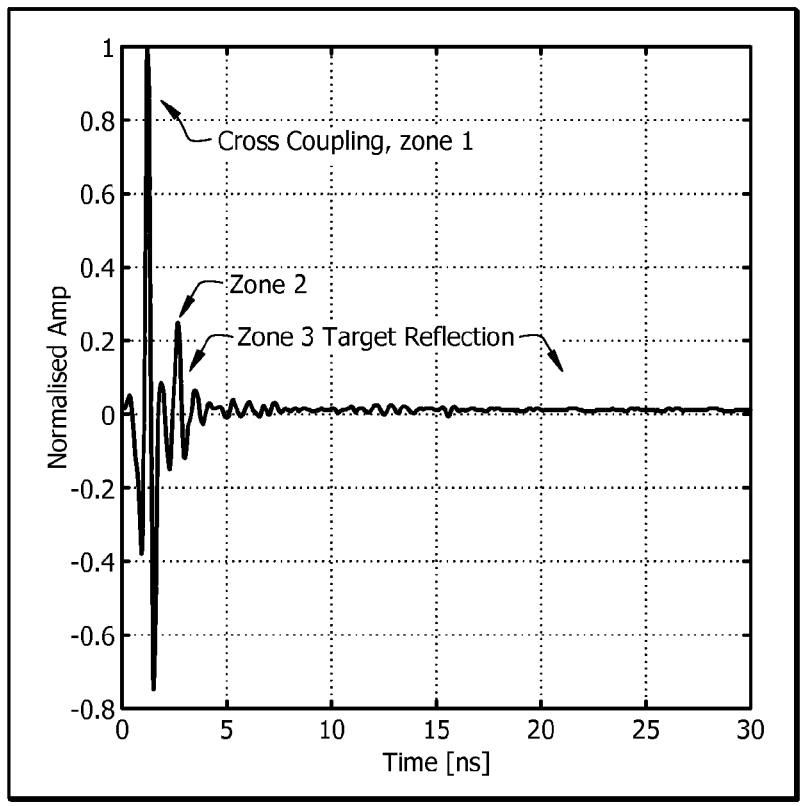
FIG. 2 shows the relative amplitude of a received radar signal (without signal processing) responsive to a UWB radar pulse incident in a storage tank having liquid product therein for an UWB radar detection process as a function of time showing three (3) time zones.

Before reviewing the Rx circuitry in FIG. 1, referring to FIG. 2, the relative amplitude of a received signal (without signal processing) responsive to a UWB radar pulse incident on a liquid product filled storage tank is shown as a function of time. The difference in amplitude between the cross coupling signal shown (zone 1), and both the reflections of the launcher and/or feed-through (zone 2) and the target signal (shown as target reflection in zone 3) can be seen to be large.

In order to acquire the relatively weak target signals for processing by processor 140, the Rx of UWB radar system 100 includes a UWB LNA 105. However, disclosed embodiments recognize the large magnitude of crosstalk (coupling) signals, and reflections from obstructions in the storage tank can give rise to permanently damaging and/or saturating the UWB LNA 105. Regarding obstructions, process and storage tanks often contain not only the products whose level needs to be measured, but also various obstacles (agitators, ladders, pipes, etc.) that can obstruct and disturb the radar signals going towards the target and coming back. Usually such obstacles that are made of metal which can generate stronger reflection signals as compared to the target signals, while the products usually are dielectric materials having lower reflectivity to the UWB radar pulse.

The PGN block 135 includes a front-end conditioner including a programmable attenuator 115 and at least one fast acting power limiter 110 (front-end conditioner is the combination 115/110). The power limiter 110 placed between the input node of UWB LNA 105 and a system ground node and/or between the input node and a power supply node functions to protect the UWB LNA 105 from large magnitude crosstalk signals and reflections from obstructions in the tank or container. Regarding the design of the front-end conditioner 115/110, after a UWB pulse is emitted by the antenna 175 driven by the Tx circuitry through the coupler 180, the Rx circuitry will begin to be exposed to incoming signals received by antenna 175 (or other antenna for separate Rx and $T_X$ antenna system embodiments) usually including the cross coupling signals, and then the target signal from the target surface reflections is received.

The power limiter 110 being placed between the input node of the UWB LNA 105 and the system ground node and/or power supply node can shunt away power in the received signal only when the magnitude of the signal voltage at this node is above a certain level. Power limiter 110 can thus clamp the power level at the input node of the UWB LNA 105. Having both the first and second power limiter 110 shown in FIG. 1 can provide the option of bidirectional protection for the UWB LNA 105. The power limiter 110 circuitry can be selected to react as a shunt, acting fast enough to protect circuitry of the UWB LNA 105 from damage and/or deep saturation, and for certain applications needing fast action, such as when the target is relatively close to the antenna 175.

Also a short recovery time may be needed in order to obtain the target signal without distortion. For instance, if a short UWB pulse has an equivalent duration of a 1 ns monocycle pulse, the recovery time of the power limiter 110 should generally be less than the equivalent pulse duration, such as at most 0.5 ns (≤½ the equivalent pulse duration). The power limiter 110 can also be selected to clamp strong (high power) received signals, and the clamping level provided should generally be less than the maximum linear input of the UWB LNA 105.

The power limiter 110 can be selected from several devices including Schottky double barrier diodes which provide ultra high-speed switching when oriented to be forward biased. As noted above, depending on the signal polarity, one power limiter 110 can be placed between the input node of the UWB LNA 105 and the system ground to provide unidirectional protection and for bidirectional protection a second power limiter can be added between the input node of the UWB LNA 105 and the positive supply rail to provide protection for signals with the other polarity to enable bidirectional protection. The power limiter 110 is generally passive device that only becomes active when the signal voltage exceeds the voltage threshold of the power limiter 110. However, from the data processing point of view, both the UWB LNA 105 and the sampling unit 120 should operate in a way that the shape of the target signal acquired will essentially not be distorted.

Figure 3:
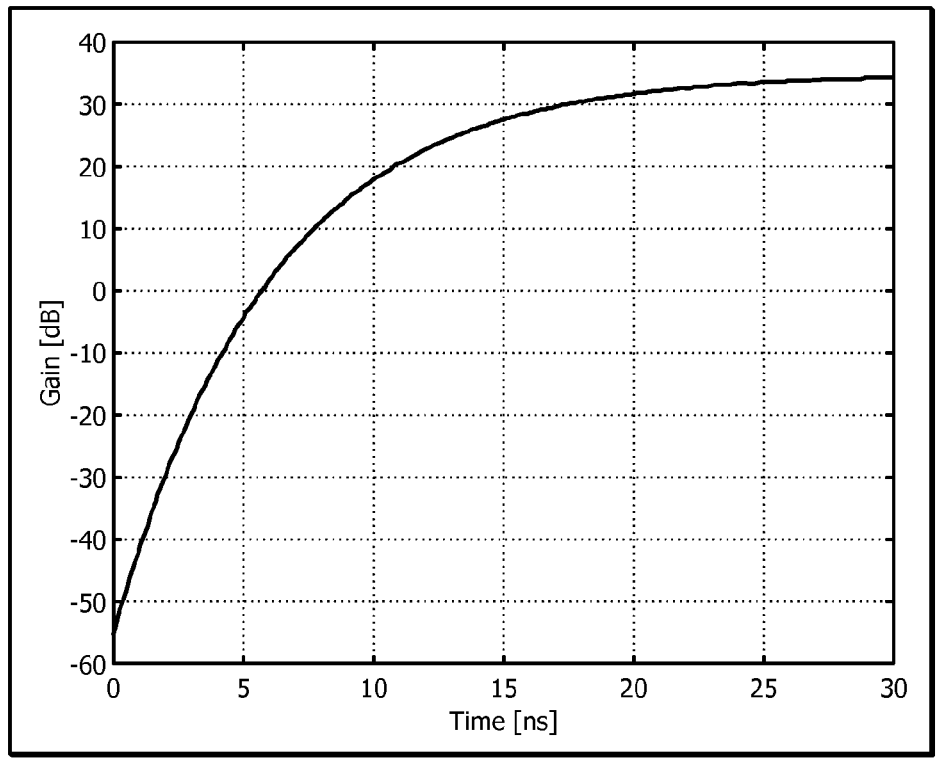
FIG. 3 shows the performance for an example disclosed PGN block where an adjustable gain or attenuation [in db] from about −55 db to 30 db is shown generated in the span of about 15 nsec.

The adjustable gain (or attenuation) provided by the PGN block 135 is provided for this purpose. The PGN block 135 can operate in a low gain or negative gain (attenuation) level when high power received signals (e.g., cross coupling signals) are encountered, whereas it can operate in a higher gain level when lower power received signals (e.g., target signals from farther away) are present. FIG. 3 shows performance for an example PGN block 135, where a programmable gain or attenuation [in db] which may be selected by processor 140 is from about −55 db to 30 db in the timespan of about 15 nsec. A gain of 1 (no gain) corresponds to 0 db, while a gain <0 db corresponds to attenuation.

Disclosed embodiments recognize since a conventional low-cost ADC cannot perform an essentially instantaneous digital conversion of a very short pulse, the input value is held constant during the time that the ADC performs a conversion (the conversion time typically is on the order of from microseconds to tens of microseconds). The S&H 120*a* performs this task, typically using a capacitor to store the analog voltage at the input, and then using an electronic switch or gate to disconnect the capacitor from the input. Although typical ADC integrated circuits (ICs) include the S&H circuitry internally to the IC, the time interval of sampling for such devices is so tiny (on the order of picoseconds), disclosed embodiments generally instead use an external S&H circuit that is externally triggered, such as by a suitable triggering circuit (e.g., timing/logic control unit 130 as shown in FIG. 1, such as implemented with Bi-CMOS circuitry).

As noted above, disclosed sampling units 120 include an external S&H 120*a* and a relatively low-speed ADC 120*b* coupled between the processor 140 and PGN block 135 to provide a sampling of the received signal after gain or attenuation applied by PGN block 135. Another output of the sampling unit 120 is shown providing triggering for the UWB pulse generator 155. As noted above, the sampling implemented by the S&H 120*a* of sampling unit 120 can be controlled by a timing-logic unit, shown in FIG. 1 provided by the timing/logic control unit 130. The sampling unit 120 comprising the S&H 120*a* and ADC 120*b* can implement the "Time Equivalent Sampling Technique" (TEST) to acquire sub-nanosecond signals and provide a dynamic range of normally about 60 dB. The "TEST" can sample and digitize the transient received signal at a fixed interval by using timing/logic control unit 130 and a relatively low sampling repetition rate. Only one point of the analog received radar signal will generally be held and sampled by the S&H 120*a* and the ADC 120*b* for each transmitted UWB radar pulse.

As shown in FIG. 2 described above, the time window for the UWB radar detection process can be divided into three zones. The first zone contains the relatively high amplitude (high power) cross coupling signals. The second time window includes reflections from the launcher and/or feed-through. The third time zone comprises the returns of object (target) reflections. By a proper configuration, which can be based on the calibration of internal hardware in system 100, or by design specifications for the radar system, appropriate adjustments can be made to the signal processing provided by processor 140. More configuration details are described in the paragraphs below. Each zone shown in FIG. 2 can be configured to have a separation in time, and thus be processed with different system settings. The PGN block 135 will generally be able to make the three zones shown in FIG. 2 be fit into the dynamic range of the sampling head of sampling unit 120, which as noted above is normally about 60 dB when implementing TEST to acquire sub-nanosecond signals.

At the beginning of the UWB radar detection process, corresponding to the first zone in FIG. 2, the initial attenuation setting for the programmable attenuator 115 can be set by processor 140 to a maximal value. By the time the acquired waveform should be displayed on the display 170 (typically nothing would appear on the display 170 because of the large attenuation of the initial attenuation setting), the attenuation setting for the programmable attenuator 115 can be adjusted to a lower value in a predefined step to collect the signals using internal coupling signal which provides a known (fixed) time delay in the first zone, such as for calibration purposes. The wavelets in this part of the time window can be acquired under about a 60-dB dynamic range. After this, the attenuator setting for the programmable attenuator 115 can be changed to a new lower attenuation value in order to acquire the signals in the second zone.

It is noted that during the time of the second zone with the new lower attenuation value for the programmable attenuator 115, the power of the signals within the first zone might have been large enough to make the UWB LNA 105 become saturated or damaged. However saturation or damage will not occur because the power limiter 110 will generally activate fast enough and shunt away sufficient power to prevent the UWB LNA 105 from saturation and damage. The recovery time of the power limiter 110 will generally be short enough when compared to the time separation between the adjacent zones. Likewise, the programmable attenuator 115 can be switched by processor 140 to another lower attenuation value to let the weak target signals reflected or scattered from the target that is a bit farther away to be acquired. Each data sample (e.g., one per time interval/zone) can thus include a quantized amplitude and a corresponding attenuator setting or gain setting in the data profile.

Depending upon the situation present, the time window can be divided into more than the three zones shown in FIG. 2. A significant feature for power limiter 110 is that its recovery time should be less than the time separation between adjacent zones. The programmable attenuator 115 may need a longer time for switching between two values. However, in this design this generally is not a problem because, for example, the PRF (pulse repetition frequency) of the short pulse generator is $f_{prf}$. Each zone corresponds to a sampling window. The number of sampling points in each zone (sampling window) is assumed to be $N_i$. The time ($T_i$) which is available for the programmable attenuator 115 to switch is given by:

$$T_i = \frac{A_g N_i}{f_{prf}} \quad (1)$$

In order to reduce the thermal noise level, the values at each sampling position can be averaged over a number ($A_g$) of acquired values. Given $A_g=10$, $f_{prf}=2$ MHz, $N_i=2000$, which are ordinary/typical values, $T_i$ is 10 ms. 10 ms is generally long enough for most programmable attenuators to be set to another value for another zone or sampling window.

The timing required for a disclosed front-end conditioner combination 115/110 depends on the propagation time from the moment at which energy is radiated from the transmitting antenna (175 in FIG. 1) to the moment at which the scattered/reflected electromagnetic energy is captured by the receiving aperture, which is also antenna 175 as shown in FIG. 1. Once the configuration of the antenna 175 is accomplished, the maximal signal level in the first two zones will generally be determined. The attenuation setting for the programmable attenuator 115 can be set properly with this information. Therefore it may be unnecessary to set the attenuation of the programmable attenuator 115 to the maximum value at the beginning of measurements. For obtaining the attenuator settings for the programmable attenuator 115 for the other zones, experiments and experience can be used.

Functions of the front-end conditioner combination 115/110 to address different application scenarios can include the following:

1. The maximum limited clamping level can be set so that the received signal level is less than the level of the 1-dB compression point (i.e., P1) of the UWB LNA 105.
2. When large amplitude useful signals are being received, clipping it by power limiter 110 prevents the UWB LNA 105 from saturation/damage. A device for the power limiter 110 can be selected to clip instead of shunt all power based on the choice of LNA that normally provides its P1 value on its specification data sheet. If one desires linear undistorted unclipped signals, then the programmable attenuator 115 can be tuned with a higher attenuation level to lower the signal amplitude so that the power limiter 110 can be automatically deactivated. Power limiter 110 as noted above is generally passive device with fast recovery time <0.5 ns. When the signal level becomes below the power limiter's voltage, then the power limiter 110 will be rapidly recovered and become "inactive".
3. When small signals (e.g., target signals) are being received, the power limiter 110 does not get activated. The attenuation for the programmable attenuator 115 can be set to "0" (pass thru mode), and the gain of UWB LNA 105 at a maximum. The gain of UWB LNA 105 is generally either adjustable, or a fixed gain. It is noted UWB LNA 105 can be constructed in single or in multiple series amplification stages.
4. When large crosstalk signals, etc. are being received, power limiter 110 can automatically be activated to clip the large signals to prevent saturation (or damage) of the UWB LNA 105. When a large crosstalk (cross coupling) signal is also wanted for a calibration purpose, the PGN block 135 can be adjusted to attenuate the signal by using attenuation from the programmable attenuator 115 while deactivating the power limiter 110, so that the large signal becomes available for calibration essentially without distortion.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A receiver for an ultra wideband (UWB) pulse radar system, comprising:
    a programmable gain network (PGN) block coupled to process a received UWB radar signal, said programmable PGN block including a programmable attenuator having an output coupled to an input node of a UWB low noise amplifier (LNA), and at least one power limiter between said input node and a ground node for said radar system or a positive supply node for said radar system, and
    a sampling unit coupled between an output of said LNA and a processor, said processor implementing an attenuation algorithm, wherein said processor is coupled to said programmable attenuator and provides attenuation control signals to dynamically control an attenuation of said programmable attenuator.

2. The receiver of claim 1, wherein said sampling unit comprises an external sample and hold (S&H) circuit having an input for receiving externally applied trigger signals coupled to an analog-to-digital converter (ADC), further comprising a timing/logic control unit, wherein an input of said timing/logic control unit is coupled to an output of said processor, and an output of said timing/logic control unit is connected to said input of said external S&H circuit to control sampling implemented by said sampling unit.

3. The receiver of claim 1, wherein a recovery time of said power limiter is less than an equivalent pulse duration of said received UWB radar signal.

4. The receiver of claim 1, wherein said power limiter comprises at least one Schottky double barrier diode.

5. The receiver of claim 1, wherein said at least one power limiter comprises a first power limiter between said input node and said ground node for said radar system and a second power limiter between said input node and said positive supply node for said radar system.

6. An ultra wideband (UWB) radar system, comprising:
a receiver comprising:
a programmable gain network (PGN) block coupled to process a received UWB radar signal from an antenna, said programmable PGN block including a programmable attenuator having an output coupled to an input node of a UWB low noise amplifier (LNA), and at least one power limiter between said input node and a ground node for said radar system or a positive supply node for said radar system, and
a sampling unit coupled between an output of said LNA and a processor, said processor implementing an attenuation algorithm, wherein said processor is coupled to said programmable attenuator and provides attenuation control signals to dynamically control an attenuation of said programmable attenuator, and
a transmitter (Tx) comprising:
a UWB pulse generator in series with a programmable UWB power amplifier coupled to said antenna or another antenna, said processor further implementing a power control algorithm, wherein said processor is coupled to said programmable UWB power amplifier for providing power control signals to dynamically control a power of UWB pulses output by said programmable UWB power amplifier.

7. The UWB radar system of claim 6, further comprising a timing/logic control unit, wherein an input of said timing/logic control unit is coupled to an output of said processor, and an output of said timing/logic control unit is connected to an input of said sampling unit,
wherein triggering signals for said UWB pulse generator are provided by said sampling unit which is controlled by signals from said timing/logic control unit.

8. The UWB radar system of claim 7, wherein said sampling unit comprises an external sample and hold (S&H) circuit having an input for receiving externally applied trigger signals coupled to an analog-to-digital converter (ADC), wherein an input of said timing/logic control unit is coupled to an output of said processor, and an output of said logic control unit is connected to said input of said external S&H circuit to control sampling implemented by said sampling unit.

9. The UWB radar system of claim 6, wherein said processor further implements a software defined radio (SDR) including a DSP/CPLD control algorithm to automatically adjust a pulse amplitude of UWB pulses output by said programmable UWB power amplifier.

10. The UWB radar system of claim 8, wherein a recovery time of said power limiter is less than an equivalent pulse duration of said received UWB radar signal.

11. The UWB radar system of claim 8, wherein said power limiter comprises at least one Schottky double barrier diode.

12. The UWB radar system of claim 8, wherein a recovery time of said power limiter is less than an equivalent pulse duration of said received UWB radar signal.

13. An ultra wideband (UWB) radar method of sensing or measurement, comprising
receiving radar signals using receiver circuitry of a radar system during an interval of time responsive to a transmitted UWB radar pulse incident in a storage tank having product material therein;
during a first time interval of said interval of time automatically setting a programmable attenuator to an attenuation level within a gain network (PGN) block also including an UWB LNA having an input node, and
during a subsequent time interval after said first time interval during said interval of time which includes a target signal, automatically reducing an attenuation level of said programmable attenuator, and
signal processing said target signal to determine at least one parameter associated with said product material.

14. The method of claim 13, wherein there is a sampling unit coupled between an output of said UWB LNA and a processor implementing said signal processing, said processor further implementing an attenuation algorithm, and wherein said processor is coupled to said programmable attenuator and provides attenuation control signals to dynamically control said attenuation level of said programmable attenuator.

15. The method of claim 13, wherein there is at least one power limiter positioned between said input node and a ground node for said radar system or a positive supply node for said radar system.

16. The method of claim 13, further comprising dynamically controlling a power of transmitted UWB pulses output by a programmable UWB power amplifier, wherein said processor implements a software defined radio (SDR) including a DSP/CPLD control algorithm to adjust a pulse amplitude of UWB pulses output by said programmable UWB power amplifier based on at least one of a distance from a transmitting antenna to said product material, and an interval of time.

17. The method of claim 13, wherein said interval of time is divided into at least three time intervals including said first time interval, said subsequent time interval, and a second time interval between said first time interval and said subsequent time interval,
wherein said attenuation level of said programmable attenuator automatically reduces monotonically from said first time interval, to said second time interval, to said subsequent time interval.

18. The method of claim 13, wherein cross coupling signals appear in said first time interval, and said attenuation level in at least a portion of said first time interval attenuates but does not eliminate said cross coupling signals.

19. The method of claim 18, further comprising signal processing said cross coupling signals after said attenuation to generate data for calibration or diagnostics of said radar system.

* * * * *